Dec. 29, 1970   F. T. COX, JR., ET AL   3,550,379
BRAKE SYSTEM AND ACTUATOR THEREFOR
Filed Feb. 12, 1969   4 Sheets-Sheet 2

INVENTORS
FRANK T. COX, JR.
RICHARD L. POWERS
BY Strauch, Nolan, Neale,
Nies & Kurz ATTORNEYS Dec. 29, 1970  F. T. COX, JR., ET AL  3,550,379
BRAKE SYSTEM AND ACTUATOR THEREFOR Filed Feb. 12, 1969  4 Sheets-Sheet 3

INVENTORS
FRANK T. COX, JR.
RICHARD L. POWERS

BY Strauch, Nolan, Neale,
Nies & Kurz
ATTORNEYS

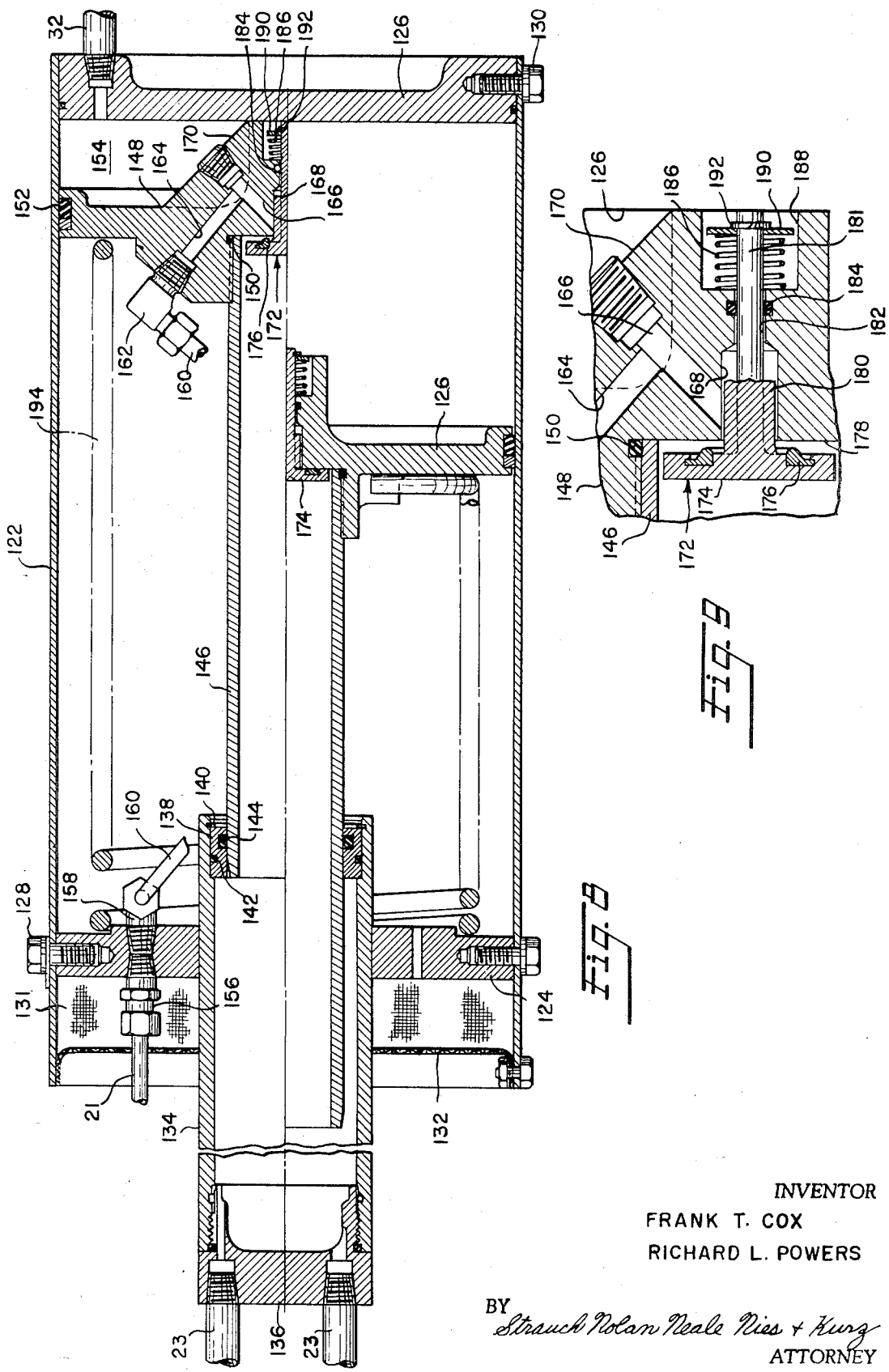

United States Patent Office 3,550,379
Patented Dec. 29, 1970

---

3,550,379
BRAKE SYSTEM AND ACTUATOR THEREFOR
Frank T. Cox, Jr., Ashtabula, and Richard L. Powers, Conneaut, Ohio, assignors, by mesne assignments, to Rockwell-Standard Company, Pittsburgh, Pa., a corporation of Delaware
Filed Feb. 12, 1969, Ser. No. 798,693
Int. Cl. F15b 7/08, 15/20
U.S. Cl. 60—54.6                                    8 Claims

ABSTRACT OF THE DISCLOSURE

An actuator assembly for the braking system of a wheeled vehicle comprises a hydraulic cylinder connected at one end to the wheel cylinders, a plunger slidably extending into the hydraulic cylinder, a fluid tight seal between the plunger periphery and the hydraulic cylinder, a pneumatic cylinder containing a spring biased slidable piston on which the plunger is secured, and valve means responsive to the position of the plunger for closing fluid communication between the hydraulic cylinder and a supply of hydraulic fluid except when the plunger is in a limit position corresponding to brake disengagement.

BACKGROUND AND SUMMARY OF INVENTION

This invention relates to vehicle brake systems and particularly to the provision in such systems of so-called air-over-hydraulic power clusters wherein a hydraulic cylinder supplying fluid under pressure to the conduits leading to the wheel cylinders is actuated by a pneumatic piston or other air pressure responsive device under manual control of the vehicle operator.

It is known to provide brake systems of this general type wherein a pneumatic power cylinder controlled by pedal action is connected to displace the piston in a more or less conventional hydraulic brake master cylinder, and the present invention contemplates an improvement over known apparatus of this nature.

In the usual master cylinder incorporated in known power clusters, a flexible seal on the master cylinder piston is required to pass over a relief port at the initial portion of its stroke, and since the hydraulic pressures involved are higher than in usual hydraulic brake systems this has been found to result in early failures at the seal. This construction is eliminated in the invention wherein the hydraulic plunger slides through a relatively stationary seal and a relief valve is carried on the plunger or the pneumatic piston for automatic operation in response to plunger displacement.

In general the invention provides a novel power cluster construction wherein a hydraulic plunger actuated in at least one direction by a pneumatic power device incorporates a valve that is automatically closed during the plunger stroke to pressurize the hydraulic fluid in the brake line and is automatically opened to communicate the plunger cylinder to a reservoir when the plunger has retracted to a predetermined position, and this is a major object of the invention.

Further objects of the invention include novel details of construction particularly the slidable mounting of the plunger, attached to pneumatically actuated piston, in a special sealed bearing arrangement at the end of a relatively stationary hydraulic cylinder, and filter arrangements for protecting the sliding surfaces within the power cluster from dirt and moisture while permitting operation of the pneumatic piston.

BRIEF DESCRIPTION OF DRAWINGS

FIG. 8 is a side elevation, partly in section, showing a further embodiment of the invention; and FIG. 9 is an enlarged fragmentary view of a portion of the unit of FIG. 8.

PREFERRED EMBODIMENTS

Figure 1:
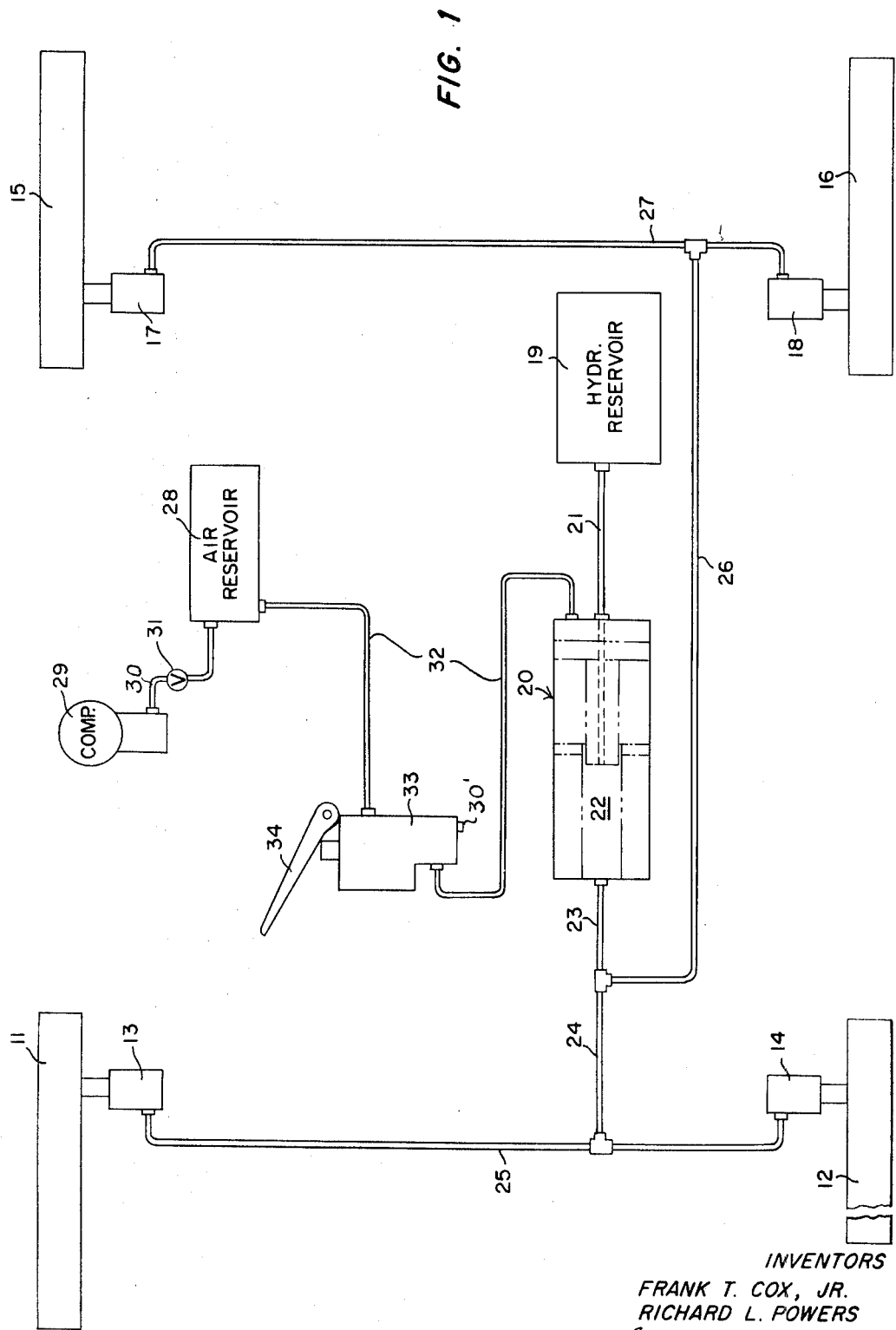
FIG. 1 is a schematic view illustrating the invention in in a preferred embodiment as incorporated in a vehicle braking system.

FIG. 1 shows a vehicle braking system wherein the forward ground engaging wheels 11 and 12 have hydraulic brake actuators 13 and 14 respectively and rearward ground engaging wheels 15 and 16 having hydraulic brake actuators 17 and 18 respectively. These actuators are preferably, but not necessarily, of the type disclosed in U.S. Letters Patent No. 3,037,584 wherein hydraulic pressure advances one or more wedges between brake shoe ends to displace the shoes into frictional engagement with drums on the wheels.

Hydraulic fluid is supplied from a reservoir 19 through a conduit 21 to a chamber 22 in a power cluster unit 20 from which it is displaced through outlet conduit 23, in a manner to be described further in detail. Conduit 23 is connected by a branch conduit 24 to a transverse conduit 25 interconnecting the forward actuators and by a branch conduit 26 to a transverse conduit 27 interconnecting the rear actuators. This its the hydraulic fluid circuit.

A reservoir 28 of compressed air is supplied with air from a compressor 29 through line 30 having a check valve 31. An outlet air line 32 is connected to unit 20 and includes a valve 33 that is normally biased closed and is relatively opened by manual pressure on a pedal or lever 34. This is the pneumatic circuit and it will be described in more detail.

Unit 20 comprises a cylindrical casing 35 having one end closed by a plate 36 secured as by studs 37 to a rigid ring 37' fixed as by welding around the adjacent casing end. An O-ring seal 38 is provided between plate 36 and ring 37'. The other end of casing 35 is closed by relatively thick plate insert 39 secured to the casing as by studs 41.

A cylindrical tube 42 is rigidly secured as by welding to the inner side of plate 39 and projects coaxially internally about half the length of casing 35. Tube 42 is thus closed at its outer end by plate 39 to define hydraulic chamber 22, and plate 39 is formed with a central opening 43 in which is threaded or otherwise suitably secured the end of hydraulic line 23.

Figure 7:
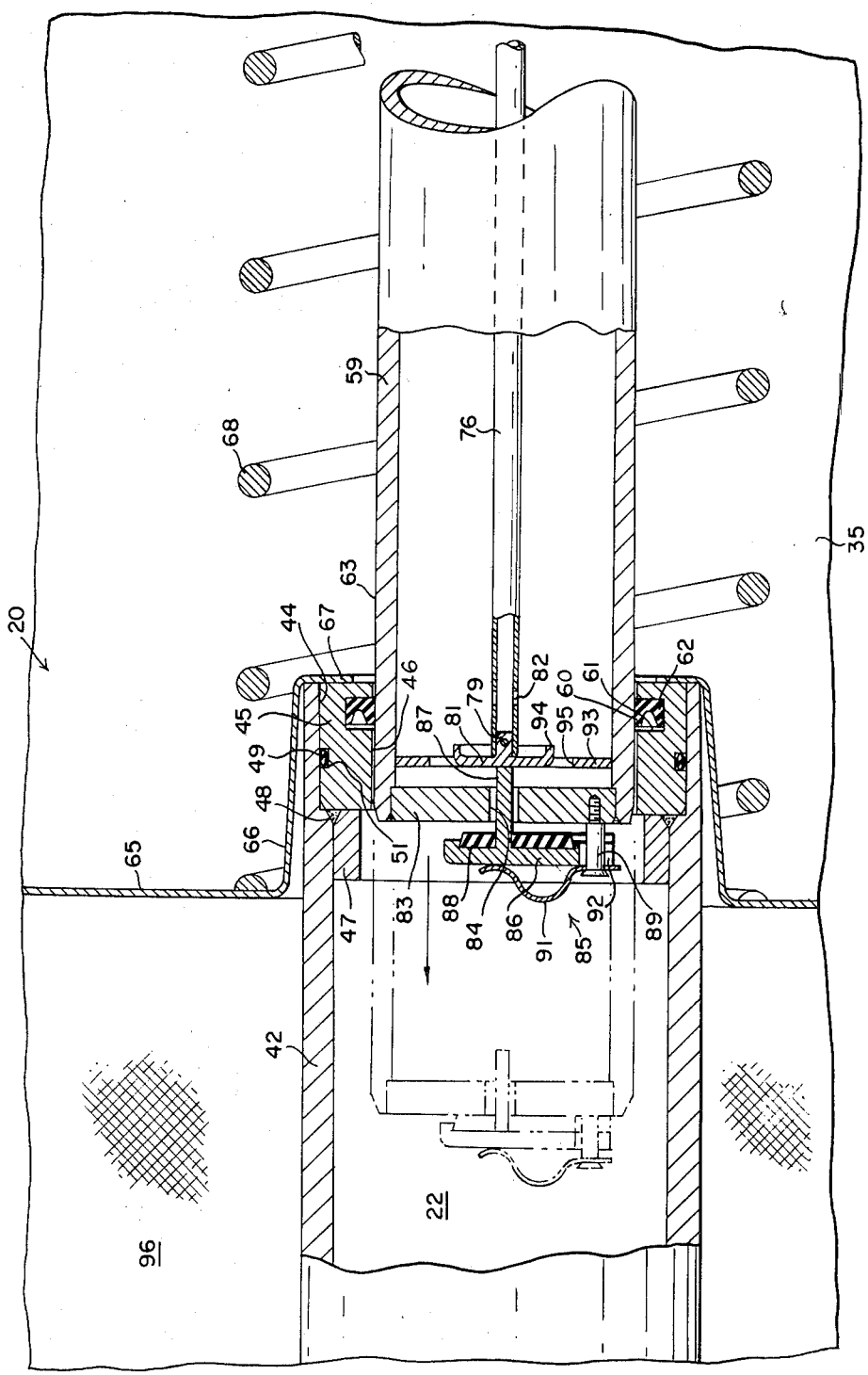
FIG. 7 is an enlarged view partly broken away and in section showing the hydraulic plunger valve and related structural detail.

At its inner end, see FIG. 7, cylinder tube 42 is formed with a shallow shoulder 44 in which is fixed a bearing sleeve 45 having a cylindrical internal surface 46. The inner end of sleeve 45 abuts an internal casing re-enforcing ring 47 fixed to tube 42 as by welding at 48. A resilient O-ring seal 49 is compressed in a groove 51 to provide a static seal.

The internal surface 52 of the casing defines a cylinder space 53 in which slides a piston 54 on the periphery of which is an annular groove 55 containing a resilient packing ring 56. The inner end of piston 54 is formed as a hollow boss 57 internally threaded at 58 to rigidly mount one end of a hollow plunger 59 that projects slidably into bearing sleeve 45.

As shown in FIG. 7 sleeve 45 is formed with an internal groove 61 mounting a compressed resilient seal ring 62 slidably surounding the cylindrical external surface 63 of plunger 59.

Cylinder space 53 is separated from the annular casing space 64 surrounding tube 42 by an annular sheet metal wall 65 formed with a central hollow boss portion 66 fitting over the end of tube 42 and terminating in an inturned flange 67 extending around the end edge tube 42. A coiled compresion spring 68 extends between wall 65 and piston 54 to normally bias the piston to its FIG. 2 position. Spring 68 is supported by coaxial bosses 66 and 57 and it serves as a retainer to mount wall 65 in axially fixed location within casing 35.

Figure 2:
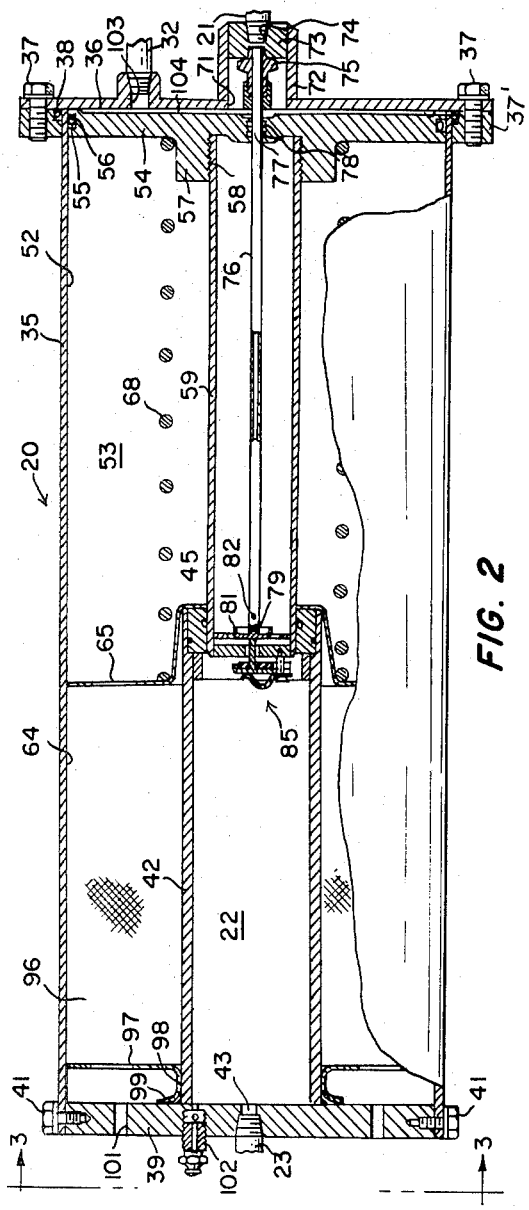
FIG. 2 is an enlarged side elevation partly broken away and in section showing details of the air-over-hydraulic power cluster unit embodied in the invention.

As shown in FIG. 2, plate 36 is centrally apertured at 71 and a hollow boss 72 projects away from the plate to mount a closure element 73 formed with a threaded aperture 74 for connection to hydraulic conduit 21. A hollow thimble 75 projects inwardly from element 73 and rigidly mounts an elongated relatively small diameter hollow axially stiff tube 76 that is open at one end to aperture 74 and conduit 21.

Tube 76 extends in slidable association through a bore 77 in piston 54, and fluid tight seals 78 are provided between plunger 54 and tube 76.

The inner end of tube 76 (FIG. 7) is closed by a plug 79 which is formed outside the tube with an enlarged end button 81 near the inner end of plunger 59. One or more small fluid ports 82 are provided in the hollow part of tube 76 adjacent plug 79. The adjacent inner end of plunger 59 is closed by an end wall plug 83 secured therto as by welding, and wall 83 is formed with a central opening 84.

Figure 6:
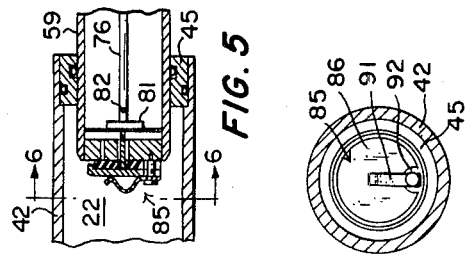
FIG. 6 is a section taken approximately at line 6—6 of FIG. 5.

A valve assembly 85 for controlling flow of hydraulic fluid through opening 84 is mounted on wall 83. This assembly comprises a vlave disc 86, usually circular as shown in FIG. 6 and of larger diameter than opening 84, having a stem 87 projecting freely through opening 84 to abut button 81 in the FIGS. 2 and 7 position of the parts. The side of disc 86 facing opening 84 carries a resilient seat element 88, so that opening 84 will be closed fluid tight when the parts are in the chain line position of FIG. 7.

A stud 89 is secured to wall 83 and projects into space 22, and a leaf spring 91 is secured on the end of stud 89 to bear on valve dic 86. Disc 86 is notched at 92 to slidably fit stud 89. As will appear spring 91 provides a resilient stop for limiting opening movement of valve disc 86 when stem 87 abuts the end of tube 76 during one phase of operation, and aids in valved closing of the opening 84 during another phase of operation.

As shown in FIG. 7, plug 79 is preferably an integral element having an enlarged radial circular skirt 93 of such diameter as to have supporting engagement with the inner wall of plunger 59. Button 81 is preferably formed by cutting and bending in several circumferentially spaced sections 94 at the central region of skirt 93, and this provides a corresponding number of openings 95 providing for fluid flow through the skirt.

The annular space 64 surrounding tube 42 is mainly filled with a porous filter material 96 such as polyurethane foam which extends between wall 65 and an annular sheet metal retainer 97 having a hub 98 surounding tube 42 and a flexible lip 99 resiliently bearing on end wall 39. Retainer 97 is preferably reticulated or otherwise apertured for passage of air into the annular filter space, and space 64 is vented to atmosphere by one or more openings 101 in wall 39.

An air bleeder fitting 102 is provided in wall 39 for permitting exit of air when space 22 is charged with hydraulic fluid.

Plate 36 is formed with an opening 103 threaded to attach the end of air pressure conduit 32 for admitting air under pressure into the cylinder space 104 to the right of piston 54 in FIG. 1.

Figure 4:
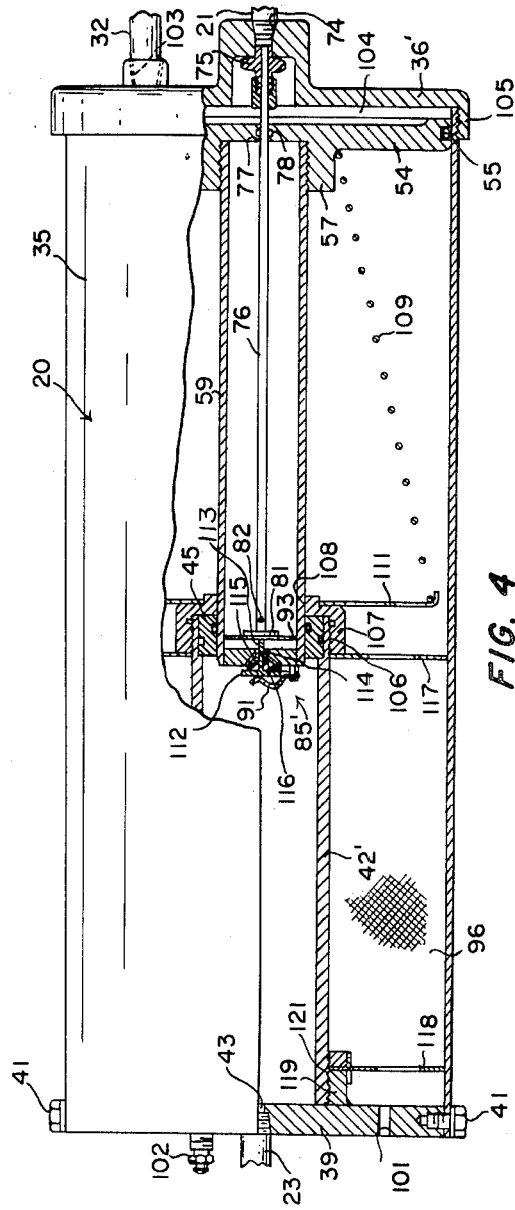
FIG. 4 is an enlarged side elevation partly broken away and in section showing another embodiment.
Figures 3, 5:
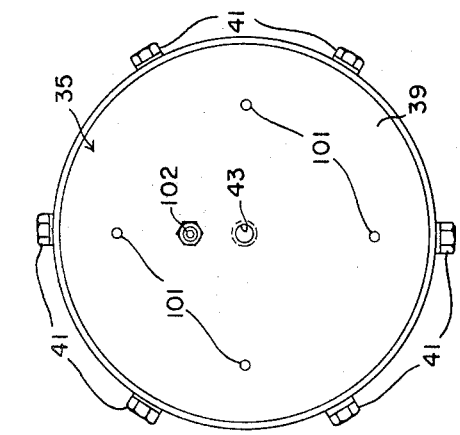
FIG. 3 is an end elevation of the unit of FIG. 2.
FIG. 5 is fragmentary view in section showing a different structure at the valved end of the hydraulic plunger.

The embodiment of FIG. 4 is generally the same but certain components are different structurally. In this embodiment end plate 36' of the casing is attached by a screw threaded peripheral rim 105.

The inner end of tube 42' is externally threaded at 106 to mount a collar 107 that axially clamps sleeve 45 on the end of tube 42'. Collar 107 has a smooth bore 108 slidingly receiving plunger 59. Spring 109 is conical with its outer end seated on piston 54 and its inner larger end seated on a sheet metal annular plate 111 fitted onto collar 107.

In this embodiment the valve assembly 85' comprises a disc 112 on which is fixed a stem 113 extending through an opening 114 in the end of the plunger. Opening 114 is surrounded by a conical seat 115 adapted to receive the resilient valve seat element 116 on disc 112.

The annulus of filter material 96 is here confined axially between sheet metal annular members 117 and 118 axially abutting collar 107 and a nut 119 threadedly connected to tube 42 at 121 and secured as by welding on the inner side of wall 39.

In operation, assuming the brakes to be disengaged at the beginning, the parts within the power cluster are disposed as shown in FIG. 2 wherein spring 68 holds air piston 54 retracted and plunger 59 is in its maximum retracted position with (see FIG. 7) its inner end disposed within bearing sleeve 45. The cylindrical surfaces 63 and 46 of the plunger and sleeve respectively are accurately cylindrical and smooth and fit closely to permit relative sliding with small tolerance and seal 62 is effective to prevent outward leakage of hydraulic fluid into air cylinder 53.

At this time it will be noted that valve 85 is unseated with rsepect to opening 84, due to stem 87 engaging fixed button 81, so that the hydraulic cylinder 22 is in fluid communication through opening 84, the space within plunger 59, ports 82, hollow tube 76 and conduit 21 with the hydraulic fluid reservoir.

When the operator wishes to apply the brakes, he moves pedal 34 to open valve 33 and apply compressed air through conduit 32 to the space 104 at the right side of piston 54 in FIG. 2, and piston 54 is displaced to the left against the resistance of spring 68.

This positively displaces plunger 59 into hydraulic cylinder 42 to thereby pressurize the hydraulic fluid in all of the conduits leading to the wheel cylinders. As plunger 59 is so displaced, valve stem 87 leaves the relatively stationary top button 81, and the combined effects of hydraulic fluid pressure and the energized spring 91 immediately snap valve 85 to close opening 84, whereby the plunger has full effect in pressurizing the hydraulic circuit. There will be no leakage of hydraulic fluid along the interface 46, 63 because of the smooth fit and seal 62.

Chamber 22 is always filled with hydraulic fluid at the start of the plunger stroke, so that plunger 59 immediately increases the brake line hydraulic pressure as it starts to move to the left in FIG. 2 without requiring the displacement of fluid into the lines before pressure is established. This provides an improved operation over known devices of this type.

As air piston 54 moves to the left in FIG. 2 it compresses spring 68 which is axially anchored on fixed wall 65. The air cylinder is allowed to vent air from the casing during this operation through opening 101. The hydraulic fluid trapped within plunger 59 does not leak into the air space because of the seal 78 at the sliding surface interface between tube 76 and piston 54.

When the operator releases the brakes, which is accomplished by releasing pedal 34 to close valve 33 to reservoir 28 and vent the air conduit to atmosphere as at 30′ in FIG. 1, spring 68 rapidly expands to displace piston 54 to the right in FIG. 2 thereby displacing plunger 59 in the same direction to relieve pressure in the hydraulic circuit. At the end of the retraction stroke of the plunger, stem 87 engages button 81 and valve 85 opens to balance fluid pressure between the plunger cylinder and the reservoir. During the retraction of cylinder 54, air will be drawn into the casing through openings 101, and this air is filtered at 96 so that the cylindrical surfaces 63 and 46 are protected against abrasives.

The operation of the device in FIG. 4 is essentially the same.

FIGS. 8 and 9, to which detailed reference will now be made, disclose a further and presently preferred embodiment of the invention. As in the previously described embodiments, the unit comprises a cylindrical casing 122 closed by end plates 124 and 126 secured to the casing by circumferentially spaced studs 128 and 130, respectively. The casing 122 projects beyond the end plate 124 to form a space containing a filter 131, the filter being held in place by a removable sheet metal cap 132.

The plunger tube 134 is welded to the end plate 124 and projects through the plate, the filter assembly 131 and the cap 132. The tube is provided at its outer end with a fitting 136 for connection to appropriate brake lines 23. At its inner end the plunger tube 134 is provided with a bearing sleeve 138 held in place with a snap ring 140, the bearing sleeve 138 carrying outer and inner O-rings 142 and 144, respectively, to provide a fluid tight seal between the plunger tube 134 and the plunger 146. At its opposite end the plunger 146 is threaded into the air piston 148, the joint between the parts being sealed by an O-ring 150. The piston 148 is provided with the usual peripheral seal arrangement 152 to provide a sealed pressure chamber 154 selectively supplied with air under pressure through the line 32.

The hydraulic reservoir line 21 is connected to the interior of the plunger 146 through a pair of fittings 156 and 158 carried by the end plate 124, the fitting 158 being connected to a flexible tube 160 coiled loosely around the plunger tube 146 and having its opposite end connected to a fitting 162 carried by the piston 148 which is provided with connecting internal passages 164 and 166, the inner end of the latter passage communicating with the inner end of a through bore 168 extending through a boss 170 in the piston.

The flow of hydraulic fluid between the reservoir and the interior of the plunger 146 is controlled by a valve assembly 172 shown separately in FIG. 9. The valve assembly comprises a valve member having a head 174 carrying on its inner face an annular resilient sealing member 176 adapted to seal against a flat annular face 178 on the piston 148. Formed integrally with the valve head 174 is a stem having an enlarged fluted portion 180 received in the enlarged portion of the piston bore 168, the stem also having a reduced cylindrical extension 181 slidable in a reduced bore 182 sealed by an O-ring 184. The valve assembly is constantly urged toward sealing position by a spring 186 compressed between the bottom wall of an end recess 188 in the piston and a plate 190 which bears against a snap ring 192 carried by the outer end of the valve stem 181. The parts are so proportioned that in the brake release position shown in FIG. 8, to which the piston 148 is urged by retraction spring 194, the end of the valve stem 181 abuts against the inner wall of plate 126 to unseat the valve 172. Immediately upon movement of the piston 148 away from its fully retracted position under the application of air pressure through line 32 the valve is seated by spring 186 and is thereafter maintained seated by the spring action augmented by the hydraulic pressure developed within the plunger 146. In all other respects the operation of the embodiment of FIGS. 8 and 9 is the same as the embodiments previously described.

An advantage of the foregoing construction is that tube 42 or 134 need not be made accurately cylindrical or finished smooth along its entire length, as is necessary in the usual master cylinder, and this reduces the expense of manufacture. A further advantage is that seal 62 or 144 is strictly a peripheral seal around the plunger and need not perform any fluid port closing function such as required for annular seals at the plungers in some conventional hydraulic cylinders.

The foregoing power cluster and system has been found to be particularly effective in larger brake systems in heavy duty vehicles where larger volumes of hydraulic fluid need be displaced efficiently and rapidly.

The embodiments of the invention in which an exclusive property or privilege is claimed are defined as follows:

1. An actuator assembly comprising a relatively stationary hydraulic cylinder closed at one end except for a fluid passage for connection to one or more devices to be actuated and open at the other end, a plunger slidably extending into said open end, means for providing a fluid tight seal between the plunger periphery and the hydraulic cylinder, pneumatic power means comprising a movable fluid responsive element selectively displaceable in opposite directions, means connecting said plunger to said element for movement therewith in either direction, conduit means for supplying hydraulic fluid from a fluid reservoir to said hydraulic cylinder, said conduit means extending through a portion of said pressure responsive element into said plunger, said conduit means including an outlet proximate one end of said plunger, a co-operating valve member resiliently biased toward said outlet, and fixed stop means adapted to engage said valve member and position said valve away from said outlet when said plunger has been displaced to a limit position in one direction.

2. An actuator assembly defined by claim 1, wherein said pressure responsive element comprises a power piston on which said plunger is mounted, said one end of said plunger being the end of said plunger remote from said power piston.

3. An actuator assembly defined by claim 1, wherein said pressure responsive element comprises a power piston on which said plunger is mounted, said one end of said plunger being the end of said plunger proximate said power piston.

4. In the actuator asembly defined in claim 1, said plunger being hollow and said conduit means including a hollow hydraulic fluid conducting rod, said rod being fixed with respect to said plunger and extending longitudinally through said plunger.

5. In the actuator assembly defined in claim 4, said outlet comprising a restricted opening in the front end of said plunger, and said stop means being carried by said rod.

6. In the actuator assembly defined in claim 1, a casing wherein said hydraulic cylinder and pneumatic power means are mounted in axially spaced relation, said fluid pressure responsive element being a piston slidable in said casing and having said plunger attached thereto, said one end of said plunger being the plunger end secured to said piston, said stop means comprising the end wall of said casing remote from said hydraulic cylinder.

7. In the actuator assembly defined in claim 1, a bearing member mounted in the open end of said hydraulic cylinder to slidably receive said plunger, and said seal comprising a resilient annulus at relatively slidable surfaces of said plunger and bearing member.

8. In the actuator assembly defined in claim 1, a casing wherein said hydraulic cylinder and pneumatic power means are mounted in axially spaced relation, one end of said casing providing a space at one side of said pressure responsive element, and filter means within the other end of said casing surrounding said hydraulic cylinder and interposed between said space and a breather air passage through the casing wall.

References Cited

UNITED STATES PATENTS

| 2,032,185 | 2/1936 | Sciaky | 60—54.5HA |
| 2,470,954 | 5/1949 | Rockwell | 60—54.5P |
| 2,682,929 | 7/1954 | Almond | 60—54.5PX |
| 2,847,782 | 8/1958 | Porter | 60—54.5P |

FOREIGN PATENTS

| 1,145,546 | 1/1942 | Australia | 60—54.6A |

MARTIN P. SCHWADRON, Primary Examiner

R. R. BUNEVICH, Assistant Examiner

U.S. Cl. X.R.

91—392